United States Patent Office 2,809,611
Patented Oct. 15, 1957

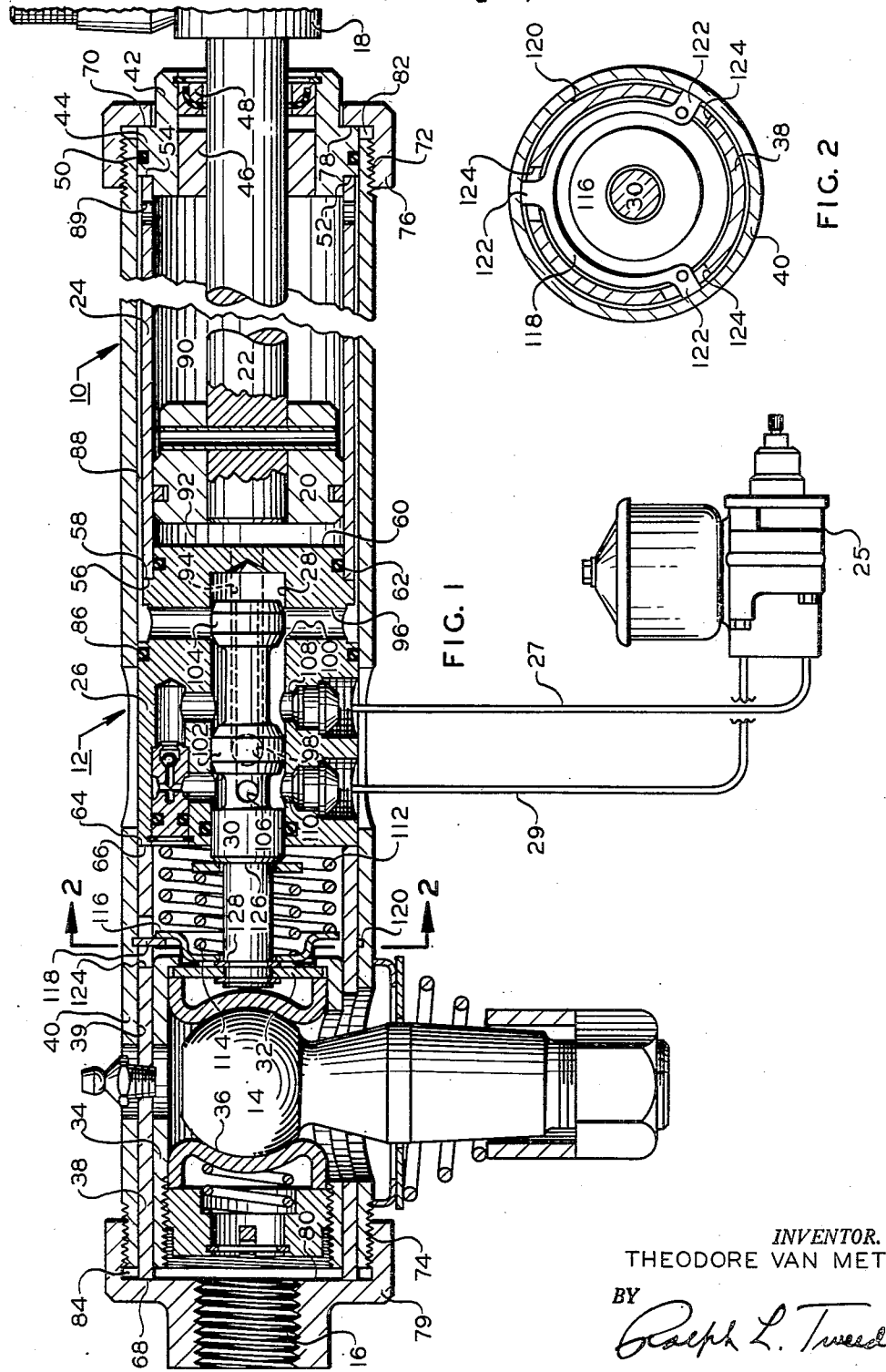

2,809,611

POWER TRANSMISSION

Theodore Van Meter, Oak Park, Mich., assignor to Vickers Incorporated, Detroit, Mich., a corporation of Michigan Application August 3, 1955, Serial No. 526,239

4 Claims. (Cl. 121—38)

This invention relates to power transmissions, and is particularly applicable to those of the type comprising two or more fluid pressure energy translating devices, one of which may function as a pump and another as a fluid motor.

The invention more particularly relates to power transmissions adapted for use in servo applications such as power steering the dirigible wheels of a vehicle.

Most designers of power steering systems for use in motor vehicles have endeavoured to retain as nearly as possible, the same handling characteristics as in the conventional, manual system. This requires a system having a neutral point wherein it exerts no steering force when the vehicle operator is exerting no force on the steering wheel. When the operator turns the steering wheel, the booster control valve is shifted from this neutral position and actuates the booster motor to assist in steering.

The type of control valve which has found the widest use in such systems has been the linear movement type, having a neutral central position and being shiftable therefrom in opposite directions to effect opposite movements of a fluid motor connected to the vehicle dirigible wheels. Such valves are usually provided with spring centering mechanisms to restore the valve to neutral position on removal of the shifting force. It is important in such valves that the centering means act to restore the valve to precisely the effective neutral position, otherwise improper steering will result. If the centered position of the valve is not made adjustable, machining tolerances must be very closely controlled, thus making the valve expensive to manufacture. Further, during severe service conditions and after long use, the original centered position may no longer be hydraulically neutral. Provisions made in the past for centering adjustments have been complex and difficult to manipulate, often requiring a number of operations.

Further, where the integral type of booster, that is, the type having the fluid motor and valve in an integral assembly, was suspended between an anchor point at one end and output member at the other end, it was necessary in the past to dismount the booster from the steering linkage assembly before adjustment of the pilot valve could be accomplished.

It is an object of the present invention to provide an improved, low cost integral type steering booster. It is a further object to provide in a booster of the integral type, wherein the motor and valve are disposed between the anchor and the output connections, provision for simple adjustment of the spring centered position of the control valve which can be accomplished from a point external of the booster and without dismounting the booster from the vehicle steering linkage.

It is a further object to provide such centering adjustment in a booster which is of a simpler and less costly construction than many boosters having no provision for adjustment of the centered position of the valve.

Further objects and advantages of the present invention will be apparent from the following description, reference being had to the accompanying drawing wherein a preferred form of the present invention is clearly shown.

In the drawing:

Figure 1 is a longitudinal section taken through a steering booster incorporating the present invention and includes schematic external circuit connections.

Figure 2 is a section taken on line 2—2 of Figure 1.

Referring first to Figure 1, the steering booster there illustrated includes a fluid motor section generally designated 10, a valve section generally designated 12, an input member 14 and an output conection 16. The motor 10 and valve 12 are co-axially disposed along a line between an anchor connection member 18 and the output connection 16.

The motor section 10 includes a piston 20 having a rod 22 which extends from a cylinder 24 and carries the anchor connection 18 thereon. In the usual vehicle installation, the anchor connection 18 is secured to the vehicle frame, the input member 14 is connected to the pitman arm, and the vehicle drag link is threaded into the output connection 16 where it may be locked with a jam nut. Pressure fluid is supplied by an engine driven pump such as that illustrated at 25 and the only external fluid connections are a delivery conduit 27 and a return conduit 29.

The valve section 12 includes a valve body 26 having a valve bore 28 therein. A valve spool 30 is disposed in the valve bore 28, and is axially slideable therein. The valve spool 30 is secured to the input member 14 through a washer 32 which is peripherially clamped between opposed surfaces of a carrier 34 for the ball and socket joint 36. Carrier 34 is axially slideable in a guide sleeve 38.

The guide sleeve 38, valve body 26, and cylinder 24 are telescopically disposed in the bore 39 of an outer sleeve 40, which extends for substantially the full length of the steering booster. Cylinder 24 is closed at its outer end by a head member 42 having an outer flange 44. The head member 42 carries a bushing 46 and seal 48, through which the piston rod 22 extends. Head member 42 also carries a seal 50 in the periphery of flange 44 to engage the bore of sleeve 40 in fluid sealing engagement. The end face 52 of flange 44 is in abutment with the end face 54 of operating cylinder 24.

The inner end face 56 of cylinder 24 abuts a shoulder 58 on valve body 26. A pilot portion 60 on valve body 26 extends into the cylinder 24 and carries a seal 62 which engages the bore of cylinder 24. The guide sleeve 38 and valve body 26 have cooperating abutting surfaces 64 and 66, respectively. Guide sleeve 38, valve body 26, cylinder 24, and the head member 42 have their abutting portions so proportioned that the stack height of the elements telescopically exposed in outer sleeve 40 slightly exceeds the length of sleeve 40. Thus the guide sleeve 38 has an end face 68 which extends from the left hand end of sleeve 40 and the head member 42 has an end face 70 which extends from the right hand end of the sleeve 40.

Sleeve 40 is provided at its opposite ends with external threads 72 and 74. An end cap 76 has a female thread which engages the thread 72, and includes an inwardly extending flange having an abutment face 78 which engages the face 70 of the head member 42. A similar flange 79 engages the threads 74 at the left hand end of sleeve 40 and includes an abutment face 80 which engages the end face 68 of guide sleeve 38. The end cap 79 also carries the output connection 16. As was heretofore noted, the stack height of the telescopically disposed elements in sleeve 40 exceeds the length of sleeve 40, thus when the internal elements are centered in sleeve 40 there will be clearance space between the outer ends of sleeve 40 and the faces 78 and 80 of the end caps 76 and 79. This clearance may be seen at 82 and 84. Tightening of end caps 76 and 79 thus compresses the telescoped parts together and retains them in bore 39 of sleeve 40. The screw threads 72 and 74 are preferably of the same hand and pitch for reasons hereinafter set forth.

The valve body 26 slideably engages the central opening 39 in sleeve 40 and is provided with a seal 86 having fluid sealing engagement therewith. The outside diameter of cylinder 24 is substantially smaller than the inside diameter of sleeve 40, thus providing an annular clearance space, or fluid passage, 88 which communicates through radial holes 89 with the outer end of cylinder 24. The seal 86 prevents leakage from the annular passage 88.

The piston 20 separates the bore of cylinder 24 into a pair of working chambers 90 and 92. Control valve 30 is operative to selectively increase the pressure in either chamber 90 or 92, to effect opposite steering movements.

The valve body 26 includes a motor passage 94 which leads directly to the working chamber 92 and a cross drilled motor passage 96 which communicates with the working chamber 90 through the annular passage 88 and radial holes 89. The motor passages 94 and 96 communicate with the valve bore 28 through motor ports 98 and 100, respectively. The valve spool 30 includes a pair of lands 102 and 104 which, in the centered position illustrated, overlie the ports 98 and 100, respectively. The various ports and lands are so proportioned as to provide conventional open center valving.

Spool 30 includes a central axial bore and a communicating cross passage 106. A supply port 108 communicates with valve bore 28 at a point which lies between the lands 102 and 104, and a return port 110 communicates with the valve bore 28 at the left of land 102. It will be seen that, in the centered position illustrated, the pressure port 108 communicates with the return port 110 across land 102 and across land 104 and through internal spool passage 106. The working chambers 90 and 92 also communicate with return port 110 in the same manner.

When valve 30 is shifted rightwardly, the resulting increased pressure in working chamber 90 reacts against the vehicle frame through anchor connection 18, rod 22, and piston 20, and acts against the inner face of head member 42 to produce a steering force which shifts the cylinder and sleeve assembly and the output connection 16 rightwardly. When valve 30 is moved to the left, the resulting increased pressure in working chamber 92 reacts against the vehicle frame through the anchor connection 18 and acts against the face of valve body 26 to produce a steering force which shifts the output connection 16 and the cylinder and sleeve assembly to the left.

The valve spool 30 is resiliently biased to the center position illustrated by biasing device which includes a pair of nested springs 112 and 114. Spring 112 acts to bias the outer periphery of a dished washer 116 against an abutment member 118 which is seated in a groove 120 in the outer sleeve 40. Referring to Figure 2, it will be seen that the abutment member 118 comprises an expanding type snap ring having three fingers 122 which engage the groove 120 in sleeve 40. The fingers 122 each extend through a clearance hole 124 in the guide sleeve 38.

The spring 114 acts between the dished washer 116 and an abutmnt 126 on spool 30 to urge a second abutment 128, carried by the spool 30, into engagement with the dished washer 116. It will thus be seen that valve spool 30 is biased to a fixed position relative to the outer sleeve 40, which position is established by engagement between the dished washer 116 and the abutment member 118.

In order that the steering booster functions properly, it is necessary that the centering means return the valve spool 30 to a neutral position such that no steering force is exerted by the motor 10. Due to the differential area of piston 20 and the machining tolerances involved in the manufacture of the valve components, it is very difficult to predict the exact spool location which will be hydraulically neutral, that is, which will produce no steering force in the motor 10. It is highly desirable that the centered position of the control valve be easily adjustable both at the original assembly and after a period of service. The present invention provides a simple, low cost arrangement for adjusting the control valve centered position from outside the booster. Further, if it is desired, the booster may be adjusted without removing it from the steering linkage.

As was heretofore noted, the threads 72 and 74 at opposite ends of the outer sleeve 40 are of the same hand and pitch. End caps 76 and 79 have mating threads engaging those threads and have sandwiched therebetween the parts which are telescopically disposed in the sleeve 40. It will be seen that if threads 72 and 74 are right hand and both end caps 76 and 79 are simultaneously rotated clockwise when viewed from the anchor connection end, all the abutting parts telescoped into outer sleeve 40 will be translated to the left. This movement is relative to outer sleeve 40. As was heretofore noted, the valve spool 30 is resiliently biased to a fixed position relative to sleeve 40, thus the adjustment of end caps 76 and 79 will cause shifting of the valve body 26 relative to the spool 30. Similarly if end caps 76 and 79 are rotated counterclockwise when viewed from the output connection end, the valve body 26 will be translated to the right. By merely adjusting the location of end caps 76 and 79, the exact hydraulically neutral centered position of valve spool 30 in valve body 26 may be established. It may, in some instances, be more convenient in the adjusting operation to hold the end caps 76 and 79 against rotation and, with a pipe wrench or spanner wrench, rotate sleeve 40.

In the factory assembly operation, a test stand will ordinarily be provided having flexible supply and return connections corresponding to conduits 27 and 29. While fluid is supplied to the booster the end caps 76 and 79 will be simultaneously rotated to obtain the hydraulically neutral position of valve 12. Final assembly and adjustment operations may thus be carried out in one operation. No special tools are required for adjustment. The entire adjustment operation is performed from the exterior of the booster. No undesirable access holes opening into the booster are required.

If desired, the booster can be adjusted on the vehicle in a similarly simple manner. It is merely necessary to hold outer sleeve 40 against rotation and simultaneously rotate end caps 76 and 79 until the valve is hydraulically neutral.

There has thus been provided an improved, low cost steering booster of the type having an adjustably centered valve spool; which requires no adjustment access holes; which is actually less complex than many boosters having no adjustment; and which greatly simplifies assembly and adjustment procedures.

While the form of embodiment of the invention as herein disclosed constitutes a preferred form, it is to be understood that other forms might be adopted, all coming within the scope of the claims which follow.

What is claimed is as follows:

1. In a servo motor and control valve structure: an outer sleeve member having an opening extending longitudinally therethrough; an operating cylinder and a control valve body telescoped into the opening in abutting relation, said body having a valve spool therein; a pair of ports in said body controlled by said spool; passage means connecting one of said ports with each end of said cylinder; means for resiliently biasing said spool to a fixed position relative to said sleeve; and end caps adjustably positioned at opposite ends of said sleeve, between which end caps said cylinder and valve body are maintained in abutting relation, whereby the normal relative position of said body and spool can be adjusted through adjustment of said end caps on said sleeve.

2. In a servo motor and control valve structure; an outer sleeve member having an opening extending longitudinally therethrough; an operating cylinder and a control valve body telescoped into the opening in abutting relation, said body having a valve spool therein; a pair of ports in said body controlled by said spool; passage means connecting one of said ports with each end of said cylinder; means for resiliently biasing said spool to a fixed position relative to said sleeve; a guide sleeve disposed in said outer sleeve in abutting relation with said valve body; an input member slideable in said guide sleeve and connected to said valve spool; and end caps adjustably positioned at opposite ends of said sleeve, between which end caps said cylinder, valve body, and guide sleeve are maintained in abutting relation, whereby the normal relative position of said body and spool can be adjusted through adjustment of said end caps on said sleeve.

3. In a servo motor and control valve structure: an outer sleeve member having an opening extending longitudinally therethrough; an operating cylinder telescoped into the opening so as to form with said sleeve an annular fluid passage leading to one end of the cylinder; a control valve body telescoped into the opening in abutting relation with the other end of the cylinder, said body having fluid sealing engagement with said sleeve to prevent leakage from said annular fluid passage, and fluid sealing engagement with said cylinder to prevent leakage therefrom; a valve spool in said body; a pair of ports in said body controlled by said spool, one of said ports communicating with said one end of the cylinder through said annular passage, and the other of said ports communicating with the other end of said cylinder; means for resiliently biasing said spool to a fixed position relative to said sleeve; and end caps adjustably positioned at opposite ends of said sleeve, between which end caps said cylinder and valve body are maintained in abutting relation, whereby the normal relative position of said body and spool can be adjusted through adjustment of said end caps on said sleeve.

4. In a servo motor and control valve structure: an outer sleeve member having an opening extending longitudinally therethrough; an operating cylinder telescoped into the opening so as to form with said sleeve an annular fluid passage leading to one end of the cylinder; a control valve body telescoped into the opening in abutting relation with the other end of the cylinder, said body having fluid sealing engagement with said sleeve to prevent leakage from said annular fluid passage, and fluid sealing engagement with said cylinder to prevent leakage therefrom; a valve spool in said body; a pair of ports in said body controlled by said spool, one of said ports communicating with said one end of the cylinder through said annular passage, and the other of said ports communicating with the other end of said cylinder; means for resiliently biasing said spool to a fixed position relative to said sleeve; a guide sleeve disposed in said outer sleeve in abutting relation with said valve body; an input member slideable in said guide sleeve and connected to said valve spool; and end caps adjustably positioned at opposite ends of said sleeve, between which end caps said cylinder, valve body, and guide sleeve are maintained in abutting relation, whereby the normal relative position of said body and spool can be adjusted through adjustment of said end caps on said sleeve.

References Cited in the file of this patent

UNITED STATES PATENTS

| | | |
|---|---|---|
| 2,340,817 | Martin-Hurst | Feb. 1, 1944 |
| 2,392,985 | Harbers | Jan. 15, 1946 |
| 2,526,361 | Johnson | Oct. 17, 1950 |
| 2,624,540 | Johnson | Jan. 6, 1953 |

FOREIGN PATENTS

| | | |
|---|---|---|
| 654,269 | Great Britain | June 13, 1951 |